United States Patent
Mecklenbräuker et al.

(10) Patent No.: US 7,106,705 B1
(45) Date of Patent: Sep. 12, 2006

(54) METHOD AND COMMUNICATIONS SYSTEMS FOR TRANSMITTING DATA FOR A COMBINATION OF SEVERAL SERVICES VIA JOINTLY USED PHYSICAL CHANNELS

(75) Inventors: Christoph Mecklenbräuker, Vienna (AT); Michael Benz, Berlin (DE); Anja Klein, Berlin (DE); Reinhard Köhn, Berlin (DE); Jörn Krause, Berlin (DE); Christian Menzel, Maisach (DE); Enric Mitjana, München (DE); Erik Newton, Southampton (GB); Martin Öttl, Weilheim (DE); Dave Randall, Romsey (GB); Armin Sitte, Berlin (DE); Jean-Michel Traynard, München (DE); Thomas Ulrich, Berlin (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/856,424

(22) PCT Filed: Nov. 25, 1999

(86) PCT No.: PCT/DE99/03742

§ 371 (c)(1),
(2), (4) Date: May 21, 2001

(87) PCT Pub. No.: WO00/33601

PCT Pub. Date: Jun. 8, 2000

(30) Foreign Application Priority Data

Nov. 30, 1998 (DE) ................................. 198 55 194

(51) Int. Cl.
*H04Q 7/00* (2006.01)

(52) U.S. Cl. ........................ 370/329; 370/341; 370/493

(58) Field of Classification Search ............. 370/230.1, 370/524, 385, 395.1, 231, 320, 329, 335, 370/342, 360, 384, 410, 441, 479, 522
See application file for complete search history.

(56) References Cited

U.S. PATENT DOCUMENTS

| 3,936,609 | A | * | 2/1976 | Waldeck ...................... 370/524 |
| 4,868,811 | A |   | 9/1989 | Suzuki |
| 5,136,612 | A | * | 8/1992 | Bi ............................... 370/342 |
| 5,157,660 | A |   | 10/1992 | Kuwahara et al. |

(Continued)

FOREIGN PATENT DOCUMENTS

EP 0 854 596 7/1998

OTHER PUBLICATIONS

ETSI SMG2/UMTS L23 Tdoc 357/98 expert group Layer1-General Requirememts Oct. 6, 1998 Milan, Italy.

(Continued)

*Primary Examiner*—Doris H. To
*Assistant Examiner*—Soon D Hyun
(74) *Attorney, Agent, or Firm*—Fish & Richardson P.C.

(57) ABSTRACT

For a communication system (e.g. UMTS with CDMA radio interface), the invention draws a distinction between services with high and low data rate dynamics and uses a matched type of signaling for the transport formats currently being used. The data rate of the data for a service can fluctuate greatly and/or rapidly over time (high dynamics), or may fluctuate only a little and/or slowly (low dynamics). The data for the services are transmitted via a common physical channel, with in-band signaling being used for signaling the transport format for the services with high data rate dynamics, and with signaling in a separate channel being used for the services with low data rate dynamics.

23 Claims, 3 Drawing Sheets

U.S. PATENT DOCUMENTS

| | | | |
|---|---|---|---|
| 5,257,283 A | | 10/1993 | Gilhousen et al. |
| 5,313,461 A | * | 5/1994 | Ahl et al. .................... 370/349 |
| 5,469,431 A | * | 11/1995 | Wendorf et al. ............ 370/254 |
| 5,592,469 A | * | 1/1997 | Szabo ......................... 370/342 |
| 5,822,309 A | * | 10/1998 | Ayanoglu et al. ........... 370/315 |
| 5,844,895 A | * | 12/1998 | Gradisching ................ 370/385 |
| 5,953,338 A | * | 9/1999 | Ma et al. ................ 370/395.21 |
| 6,018,528 A | * | 1/2000 | Gitlin et al. ................. 370/436 |
| 6,122,759 A | * | 9/2000 | Ayanoglu et al. .............. 714/57 |
| 6,205,143 B1 | * | 3/2001 | Lemieux ................ 370/395.61 |
| 6,636,497 B1 | * | 10/2003 | Honkasalo et al. ......... 370/335 |
| 6,678,527 B1 | * | 1/2004 | Rasanen ...................... 455/450 |

OTHER PUBLICATIONS

ETSI STC SMG2#28 Tdoc 508/98 "UE-UTRAN Radio Interface Protocol Architecture" Stage2, Nov. 16, 1998 Dresden, Germany.

ESTI STC SMG2#28 T doc 515/98 "Vocabulary Used in Radio Interface Protocol Specifications" Draft, Version0.20, Nov. 16, 1998 Dresden, Germany.

The GSM SYSTEM "The Radio Interface" XP-002137738 98/5843 p. 190-191.

* cited by examiner

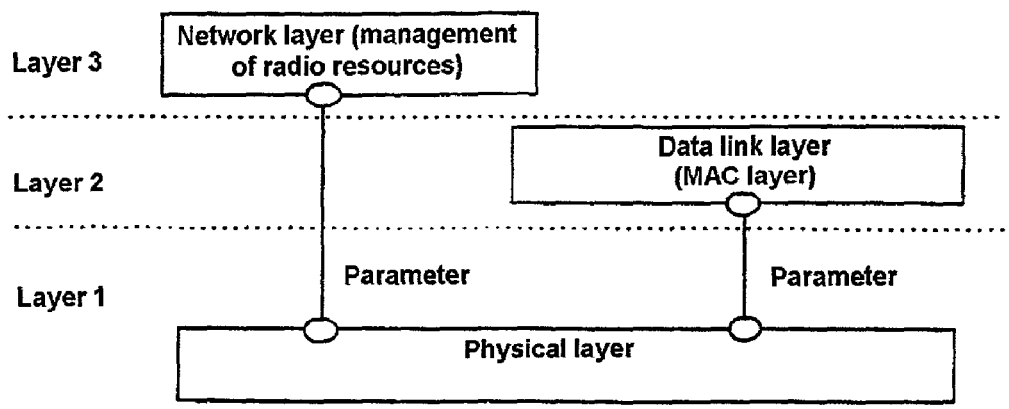

METHOD AND COMMUNICATIONS SYSTEMS FOR TRANSMITTING DATA FOR A COMBINATION OF SEVERAL SERVICES VIA JOINTLY USED PHYSICAL CHANNELS

FIELD OF INVENTION

The invention relates to a method and a communication system for transmitting data for a combination of a plurality of services via jointly used physical channels, in particular in mobile radio systems having broadband radio channels.

BACKGROUND

A communication system provides one or more physical transmission channels for transmitting data between a data source and a data sink. The transmission channels may be of a wide variety of types, e.g. for cable-conducted transmission using electrical or optical signals or for radio transmission via a radio interface using electromagnetic waves. The text below concerns radio transmission, in particular.

Radio transmission is used in mobile radio systems in order to set up a connection to nonstationary subscriber terminals. A mobile station in a mobile radio system is such a nonstationary subscriber terminal. Within the network coverage, the mobile station can request a connection from any desired locations, or a connection can be set up to the mobile station. The most common mobile radio system is GSM (global system for mobile communications), which was developed for a single service, for voice transmission purposes. The data rate of this service was assumed to be constant. The GSM mobile radio system is called a 2nd generation system.

By contrast, the successive mobile radio generation, the 3rd mobile radio generation, which is currently being standardized in Europe under the name UMTS (Universal System for Mobile Communications), has provision for a plurality of services, which are to be transmitted within a transmission protocol.

The standardization documents ETSI SMG2/UMTS L23 expert group, Tdoc SMG2 UMTS-23 257/98, dated Oct. 6, 1998, Tdoc SMG2 508/98 and Tdoc SMG2 515/98, dated Nov. 16, 1998, give an overview of the present state of development of standardization and, in particular, an overview of the requirements in terms of how a transmission protocol can support the transport of data for a plurality of services.

The use of a common physical channel for transmitting data for a plurality of services presupposes that a unique mapping specification indicates the allocation of the services to different segments of the physical channel. By way of example, a physical channel is defined by a frequency band, a spread code (CDMA code division multiple access) and, if appropriate, a time slot within a frame.

The following terms are used to describe the mapping specification:

Transport Format (TF):
 A transport format defines a data rate, a coding, scrambling (interleaving), a data rate adjustment by puncturing and an error protection specification for a transport channel for a service.

Transport Format Set (TFS):
 This denotes a set of possible transport formats which are permitted for a specific service.

Transport Format Combination (TFC):
 This term indicates a possible combination of the transport formats for the various services which are mapped onto a common physical channel.

Transport Format Combination Set (TFCS):
 This denotes a set of possible TFCs as a subset of all TFCs which are permitted for a specific connection.

Transport Format Combination Identifier (TFCI):
 This information item indicates the currently used combination of the transport formats within the TFCs.

Examples relating to the transport formats can be found in ETSI SMG2/UMTS L23 expert group, Tdoc SMG2 UMTS-23 257/98, dated Oct. 6, 1998, pp. 14–16.

In order to be able to select the currently used combination of the transport formats for the various services in line with requirements, the TFC needs to be able to be changed and hence the TFCI needs to be signaled regularly. This signaling ties up transmission capacity, however. The greater the number of possible combination options (TFCS), the more capacity is required for signaling.

SUMMARY

The invention is based on the object of specifying a method and a communication system which reduce the required signaling capacity without limiting the number of combination options and the selection thereof. This object is achieved by the method in accordance with the features of claim 1 and by the communication system having the features of claim 10. Advantageous developments can be found in the dependent claims.

The invention draws a distinction between services with high and low data rate dynamics and uses a matched type of signaling for the transport format currently being used. The data rate of the data for a service can fluctuate greatly and/or rapidly over time (high dynamics), or may fluctuate only a little and/or slowly (low dynamics). The data rate dynamics correspond to the differential of the data rate change over time.

No joint signaling for all services takes place, but instead signaling which can be individualized; in this case, the services having different dynamics are transmitted via the available physical channels and cannot be readily evaluated without this signaling. For services with high data rate dynamics, in-band signaling of the transport format is carried out, and for services with low data rate dynamics, the transport format is signaled in a separate channel. In-band signaling supports the high dynamics of the data rate change in many services by signaling newly chosen transport formats at an appropriate speed, whereas somewhat slower signaling accompanying the connection is chosen for services with data rates which change only slowly or to a limited extent.

On the basis of stipulating a combination of the currently used transport formats for the services and the signaling thereof, the data for the services are transmitted via the currently available common physical channels on the basis of the combination of the transport formats and, at the reception end, are evaluated on the basis of the signaled combination of the transport formats.

With the same number of combination options, less capacity is required for in-band signaling, since only a portion of the services need be served constantly.

In accordance with one advantageous development of the invention, data transmission takes place via a radio interface of a radio communication system. In radio communication systems, e.g. UMTS, the transmission resources are particularly scarce. The number of available frequency bands is limited, and each operator can use only a certain portion thereof. Nevertheless, high data rates (up to 2 Mbit/s) need to be offered for many services. The invention provides particular advantages for such a radio communication system.

A particularly flexible strategy for allocating transmission capacities to connections is made possible when a radio interface is formed by a broadband frequency channel, with signals being transmitted simultaneously in a plurality of physical channels which can be separated by spread codes and additionally by time slots. By modifying the spread code or by allocating additional spread codes, the transmission capacities can rapidly be matched to the requirement. The invention is suitable both for use in FDD (frequency division multiplex) mode and in TDD (time division multiplex) mode in a radio communication system.

It is also advantageous to use a monitoring channel (FACH), which accompanies the connection, for the separate channel for signaling the transport format for services with low data rate dynamics. Such a monitoring channel is provided for tasks which accompany connections—connection setup and connection cleardown—and can be used concurrently without additional effort. By way of example, voice transmission is a service with low data rate dynamics, with a standard data rate and "zero" being stipulated as possible data rates, for example. At the start of a connection, the standard data rate is signaled, and the data rate "zero" is signaled at the end of the connection. This signaling relates to the respective data rate; setup or cleardown of the connection is not signaled in this case. The same applies for pauses in speech. In the latter case, signaling in the separate channel is carried out only when the data rate for a service with low data rate dynamics changes. Constant repetition of the currently chosen transport format for this service is suppressed.

In accordance with another advantageous development of the invention, a partial information item relating to the combination of the currently used transport formats is signaled for services with high data rate dynamics, the partial information item using a binary coding having a number of places which is reduced in comparison with the total amount of the permitted combinations of all services. This information item is called a partial information item because a complete mapping specification is obtained only in connection with the signaling in the separate channel. For particularly rapid signaling, the partial information item is transmitted in each frame of the data transmission of the common physical channel. This also results in a very rapid change in the chosen combination, which is limited only by any scrambling of the data over a plurality of frames which is carried out.

The signaling according to the invention can be matched to the data rate dynamics to a greater extent if an individual signaling capacity can be set within the in-band signaling for the services. Thus, for example, the partial information item is coded and distributed over a plurality of frames (interleaving) such that the transport format of services with very high data rate dynamics can actually be recognized at the reception end after evaluation of one or two frames.

DESCRIPTION OF THE DRAWINGS

Illustrative embodiments of the invention are explained in more detail using the appended drawings, in which
FIG. 2 shows a layer model of the transmission protocols,
FIG. 5 shows a table containing a mapping specification for services with high data rate dynamics.

DETAILED DESCRIPTION

Figure 1:
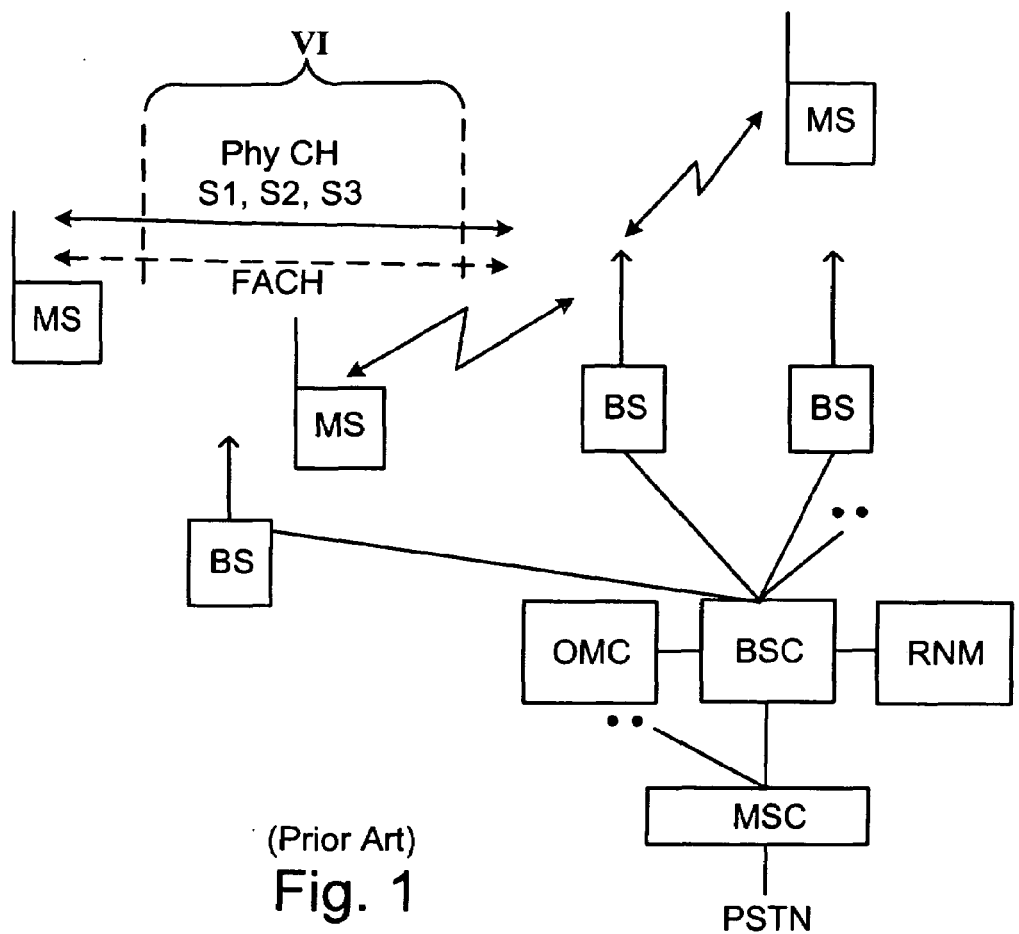
FIG. 1 shows a schematic illustration of a radio communication system.

The mobile radio system shown in FIG. 1 as an example of a radio communication system comprises a multiplicity of mobile switching centers MSC which are interlinked and set up access to a landline network PSTN. In addition, these mobile switching centers MSC are connected to at least one respective device RNM for controlling the transmission resources. Each of these devices RNM permits, in turn, a connection to at least one base station BS and represents means which divide services 5 into two classes on the basis of individual service data rate dynamics.

A base station BS can set up a connection to subscriber stations, e.g. for mobile stations MS or other mobile and stationary terminals, via a radio interface. Each base station BS forms at least one radio cell. FIG. 1 shows connections for transmitting useful information between a base station BS and mobile stations MS. Within a connection V1, data for, by way of example, three services S(S1, S2, S3) are transmitted within one or more physical channels Phy CH, and signaling information, is transmitted via a monitoring channel FACH (Forward Link Access Channel) which accompanies the connection.

An operation and maintenance center OMC provides monitoring and maintenance functions for the mobile radio system or for parts thereof. The functional scope of this structure can be transferred to other radio communication systems in which the invention can be used, in particular for subscriber access networks with wireless subscriber access.

In the radio communication system shown in FIG. 1, both the base stations BS and the mobile stations MS are provided with data transmission means, and signaling means which communicate with one another. The data transmission means are used for transmitting data for a combination of a plurality of services S via the currently available common physical channels Phy CH. For services S1, S2 with high data rate dynamics, the signaling means signal the transport format TF in-band, and for services S3 with low data rate dynamics, the signaling means signal the transport format TF in the separate channel FACH.

The layer model shown in FIG. 2 shows the protocols of the radio communication system divided into three layers.

Layer 1: physical layer for describing all the functions for bit transmission via a physical medium (e.g. coding, modulation, transmission power monitoring, synchronization etc.), Layer 2: data link layer for describing the mapping of data onto the physical layer, and monitoring thereof, Layer 3: network layer for controlling the resources of the radio interface.

Other details can also be found in ETSI SMG2/UMTS L23 expert group, Tdoc SMG2 508/98, dated Nov. 16, 1998, pp. 9–25 (FIG. 11). Layer 3 stipulates the TFCS for a connection, while layer 2 selects a combination (of a TFC) which is signaled in-band and in a separate channel using a TFCI, as shown later.

The parameter exchange between Layers 1 and 2 supports the functions of transferring frames with data for Layer 2 via the radio interface and of displaying the status of Layer 1 to higher layers. The parameter exchange between Layers 1 and 3 supports monitoring of the configuration of the transmission in Layer 1 and generates system information relating to Layer 1.

In this case, the mapping of the data for various connections S onto a common physical channel Phy CH corresponds to the interaction of Layers 1 and 2.

Figure 3:
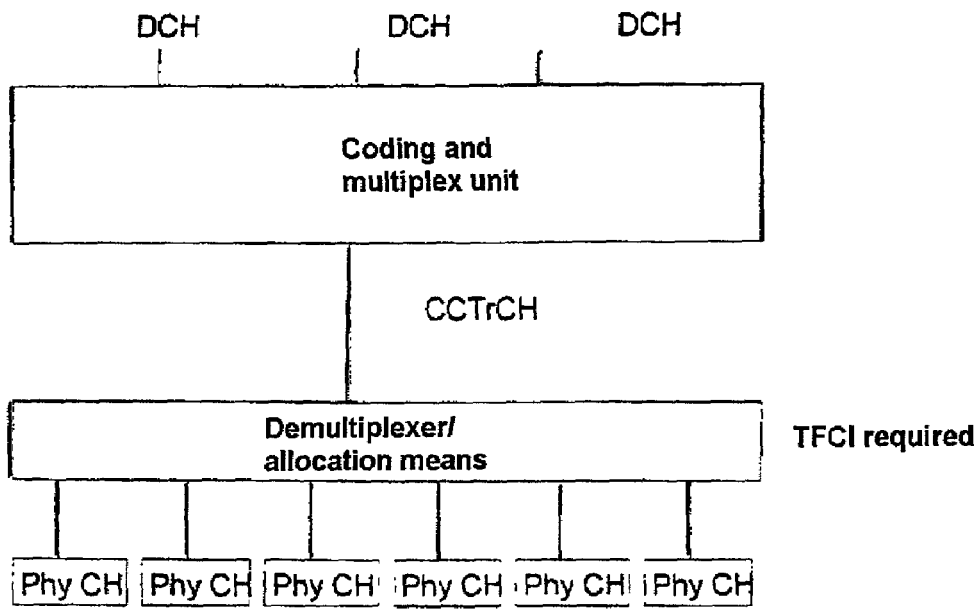
FIGS. 3, 4 show data for various services mapped onto common physical channels.
Figure 4:
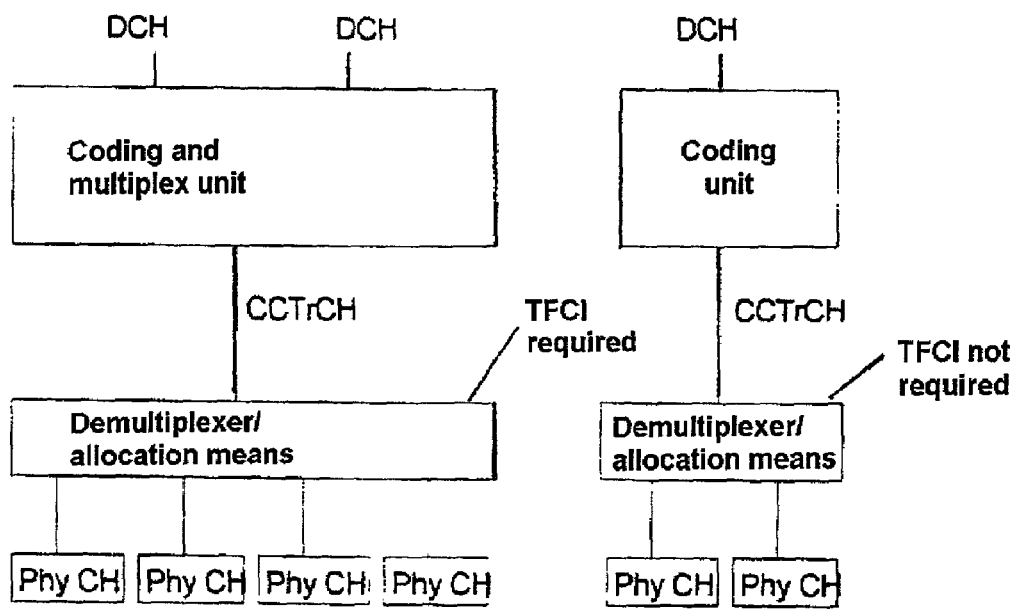

In accordance with FIGS. 3 and 4, transport formats TF need to be signaled for currently transmitted services.

FIG. 3 shows, as an illustration of function, a coding and multiplex unit which maps data from a plurality of data channels DCH (which each correspond to the data for a service S1, S2, S3) onto a coded common transport channel CCTrCH. In this context, mapping is a specification governing the bit pattern which is to be used for entering the data into a serial data sequence. A demultiplexing/allocation means distributes the data for the coded common transport channel CCTrCH over a plurality of physical channels Phy CH. The physical channels Phy CH are thus always used to transmit data for a plurality of services S1, S2, S3 in each case. A physical channel Phy CH is not allocated to one service S1, S2 or S3 alone, but rather is allocated to the coded common transport channel CCTrCH with all its services S1, S2, S3.

Since the reception end needs to reconstruct this mapping and needs to read the data from the physical channels Phy CH and present them again in separate transport channels DCH for the services, signaling is necessary. This signaling in the form of a partial information item TFCI depicts the currently used combination of the transport formats TF for the services. Which combinations are permitted for the connection (TFCS) has been agreed for connection setup.

FIG. 4 shows the mapping in a slightly modified form, with it becoming clearer that the partial information item TFCI need be signaled only when physical channels Phy CH are jointly used by a plurality of services S1, S2, S3. If a service S1 or S2 or S3 uses one physical channel Phy CH exclusively, then signaling of the partial information item TFCI can be dispensed with.

According to the invention, however, standard signaling is not chosen for all services, but instead the services S are distinguished by services S1, S2 with high data rate dynamics and a service S3 with low data rate dynamics. It may be assumed that S1 and S2 are two data services, e.g. S1 is a video transmission and S2 is an Internet link. S3 may be voice transmission. The classification of the services into one of the two classes is stipulated at the start of a connection, but may be changed during the connection. Such a change is made if the number of services changes and hence in-band signaling capacity becomes free or necessary, or if the character of a service changes in terms of the data rate dynamics.

The permitted transport formats TF are stipulated as shown in FIG. 5. Voice transmission is distinguished only by two data rates (basic data rate 16 kbit/s or no data transmission, or pause in speech). Four different transport formats TF are available for each of the two services S1, S2.

The transport format TF30, TF31 for the service S3 is transmitted separately from the physical channels Phy CH for data transmission, in a rapid monitoring channel FACH accompanying the connection. Since the changes in the data rate are rather uncommon, hardly any transmission capacity is lost if the signaling takes somewhat longer.

The transport formats TF for the services S1, S2 are coded in accordance with the table in FIG. 5. Since a total of 32 combinations of the various transport formats TF are possible for the three services S1, S2, S3, 5 bits would be needed, in binary representation, to code this information item. In accordance with FIG. 5, however, only 4 bits are necessary, since the current transport format TF30 or TF31 for S3 is signaled separately.

The 4 bits of the signaling for S1 and S2 are transmitted in-band. In line with FIG. 6, within transmission of data (data) in frames together with other information, capacity is also provided for transmitting the currently chosen combination of the transport formats in the form of the partial information item TFCI. In FDD mode, a frame lasts 10 ms, with bits of a pilot sequence (pilot) being used for channel estimation, bits (pc) being required for transmission power regulation, and bits being reserved for in-band signaling of the TFCI. There is then a data component data containing useful information.

Figure 6:
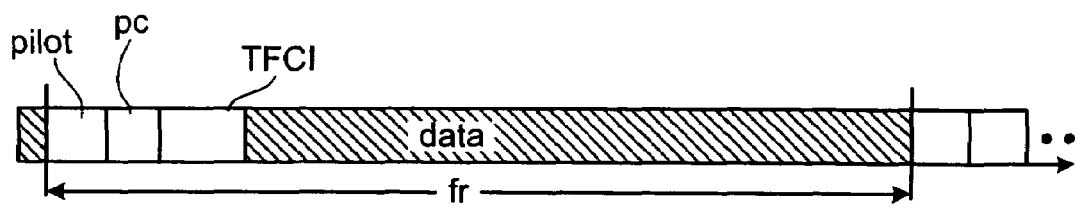
FIG. 6 shows data transmission in frames with in-band signaling.

Error protection coding of the TFCI on 32 bits, for example, and scrambling of the useful information over a plurality of frames are not shown in FIG. 6. The description of the chosen transport formats applies for one transmission direction. In a connection, data can naturally be transmitted in both transmission directions (UL upward direction from the mobile station MS to the base station BS, and DL downward direction from the base station BS to the mobile station MS), and different transport formats TF can be stipulated for the data rates in an entirely asymmetrical and appropriate manner.

The invention claimed is:

1. A method comprising:
    specifying one or more first transport formats for first services and a second transport format for a second service, the first services having higher data rate dynamics than the second service;
    transmitting a combination of data for the first services and data for the second service over a first channel based on the first and second transport formats;
    signaling, in-band in the first channel, the one or more first transport formats for the first services; and
    signaling, in a second channel, the second transport format for the second service, the first channel and the second channel comprising separate channels.

2. The method of claim 1, wherein all data is transmitted via a radio interface of a radio communication system.

3. The method of claim 2, wherein the radio interface comprises broadband frequency channels that include the first and second channels; and
    wherein the first and second channels are separated by at least one of a spread code and a time slot.

4. The method of claim 1, wherein the second channel comprises a monitoring channel.

5. The method of claim 1, wherein data rate dynamics corresponds to a fluctuation in data rate over time, the higher rate dynamics having a higher fluctuation in data rate over time than the lower data rate dynamics; and
    wherein signaling the second transport format occurs if a data rate for the second services changes.

6. The method of claim 1, further comprising:
    mapping data for the first and second services onto a coded common transport channel; and
    spreading data on the coded common transport channel over a plurality of physical channels, at least one of the physical channels including the first channel.

7. The method of claim 1, further comprising:
signaling a partial information item, the partial information item corresponding to a combination of transport formats for services with a specific type of data rate dynamics, the specific type of data rate dynamics comprising the higher data rate dynamics, the partial information item comprising a binary code having a number that is less than a total number of permitted combinations of services.

8. The method of claim 7, wherein the data is transmitted over the first channel in frames; and
wherein the partial information item is transmitted in at least one of the frames.

9. The method of claim 7, wherein the data is transmitted over the first channel in frames;
wherein the method further comprises setting a signaling capacity in at least one of the first channel and the second channel; and
wherein the partial information item is signaled via a plurality of frames.

10. A communication system comprising:
means for transmitting data for a combination of first services and a second service over a first channel, the first services having a higher data rate dynamics than the second service; and
means for:
(i) signaling, in-band in the first channel, one or more first transport formats for the first services; and
(ii) signaling, in a second channel, a second transport format for the second service, the first channel and the second channel comprising separate channels.

11. The communication system of claim 10, wherein data rate dynamics corresponds to a fluctuation in data rate over time, the higher data rate dynamics having a higher fluctuation in data rate over time than the lower data rate dynamics.

12. The communication system of claim 10, wherein the second channel comprises a monitoring channel.

13. The communication system of claim 11, wherein the means for signaling signals the second transport format if a data rate changes for the the second service.

14. The communication system of claim 10, further comprising:
means for mapping data for the first and second services onto a coded common transport channel; and
means for spreading data on the coded common transport channel over a plurality of physical channels, at least one of the physical channels including the first channel.

15. The communication system of claim 10, wherein the means for transmitting comprises a radio communication system.

16. The communication system of claim 10, wherein the means for signaling signals a partial information item, the partial information item corresponding to transport formats for services with a specific type of data rate dynamics, the specific type of data rate dynamics comprising higher data rate dynamics for the first services, the partial information item comprising a binary code having a number that is less than a total number of permitted combinations of services.

17. The communication system of claim 16, wherein the data is transmitted over the first channel in frames, and the partial information item is transmitted in at least one of the frames.

18. The communication system of claim 16, wherein the data is transmitted over the first channel in frames; and
wherein the communication system further comprises:
means for setting a signaling capacity in at least one of the first channel and the second channel; and
means for transmitting the partial information item via a plurality of frames.

19. The method of claim 1, wherein data rate dynamics corresponds to a fluctuation in data rate over time, the higher data rate dynamics having a higher fluctuation in data rate over time than lower data rate dynamics.

20. The method of claim 19, further comprising:
detecting a change in a data rate for the second service; and
in response to the change, signaling a new transport format in the second channel.

21. The method of claim 19, further comprising:
signaling a standard data rate at a beginning of a connection to a receiver, the receiver for receiving transmitted data for the first service and the second service; and
signaling a data rate of zero at an end of the connection.

22. The method of claim 1, further comprising:
evaluating the data at a receiver based on the first and second transport formats.

23. The communication system of claim 10, further comprising:
a receiver to receive the data from the means for transmitting, the receiver comprising means for evaluating the data based on the first and second transport formats.

* * * * *